Nov. 4, 1958  M. C. MAGARIAN  2,858,756
HARROW HITCH

Filed April 15, 1954  2 Sheets-Sheet 1

MASICK C. MAGARIAN
INVENTOR

HUEBNER, BEEHLER,
WORREL & HERZIG
ATTORNEYS

BY Richard M. Worrel

Nov. 4, 1958
M. C. MAGARIAN
2,858,756
HARROW HITCH
Filed April 15, 1954
2 Sheets-Sheet 2
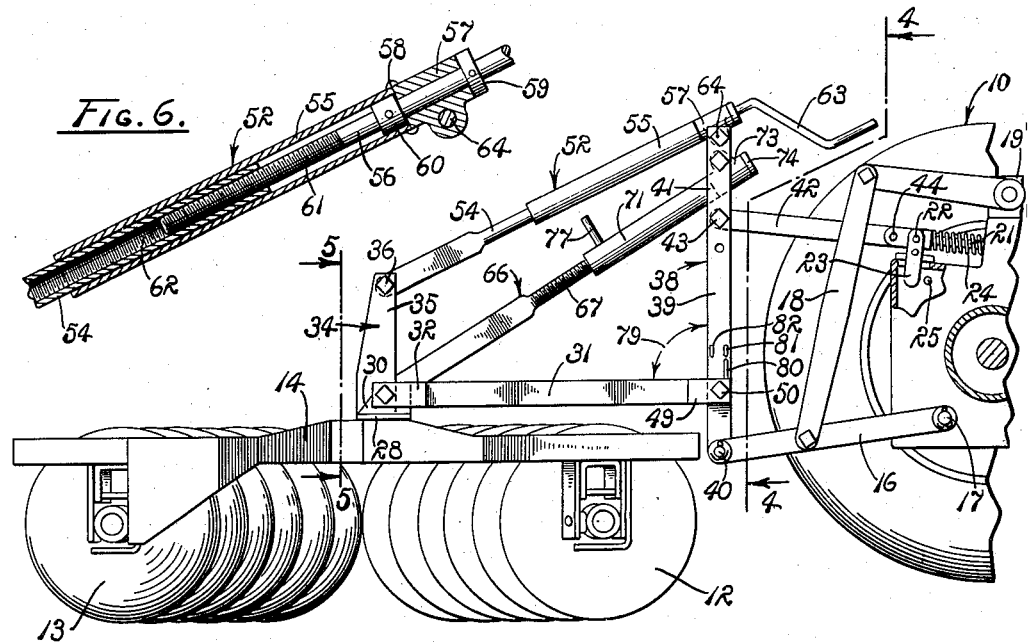
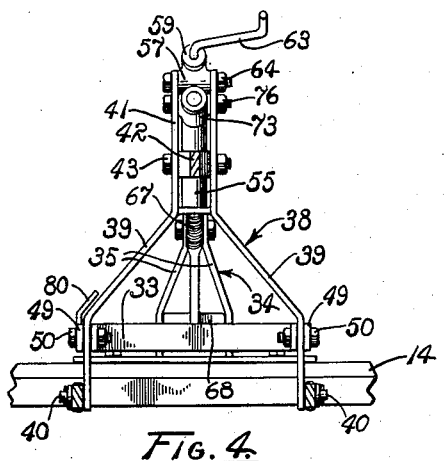
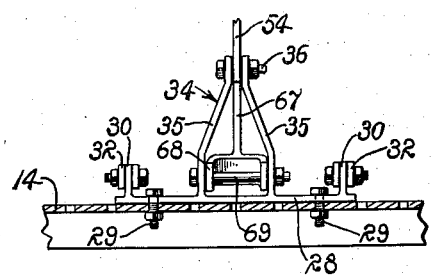
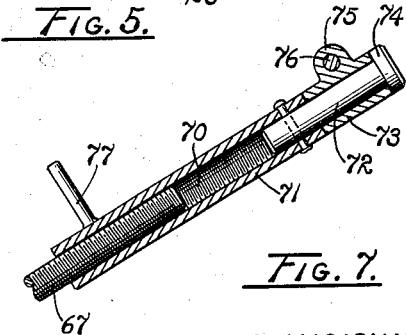
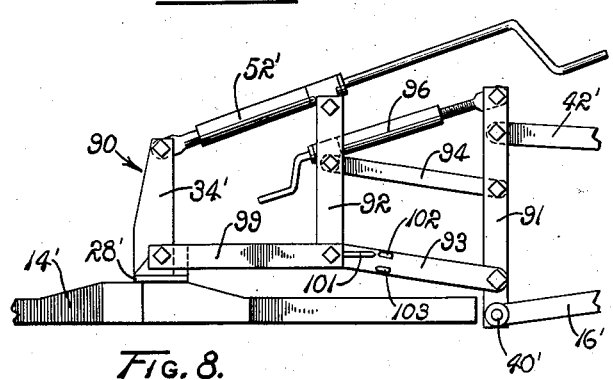
MASICK C. MAGARIAN
INVENTOR
HUEBNER, BEEHLER,
WORREL & HERZIG
ATTORNEYS United States Patent Office 2,858,756
Patented Nov. 4, 1958

2,858,756
HARROW HITCH
Masick C. Magarian, Fresno, Calif.
Application April 15, 1954, Serial No. 423,319
8 Claims. (Cl. 97—46.07)

This invention relates to improvements in hitch structures for attaching farm implements to tractors.

Present day tractors are provided with power devices for raising and lowering the pulling arms of the tractor so that an implement, such as a harrow, to be pulled by the tractor, may be set to operate in the soil at a desired depth. In practice it is found that merely setting the implement in a desired elevated or lowered position with respect to the tractor will not necessarily insure efficient operation of the implement to the desired depth. Thus, for example, in cases where hard soil is being worked, the weight of the implement may be insufficient to cause it to penetrate into the soil the intended extent. In soft soil, implements tend to dig deeper than is desired and in such instances even though an implement be elevated with respect to the tractor to operate above its lowermost point, at times it may excessively penetrate into the soft soil so as to anchor the tractor and cause the drive wheels of the tractor to spin.

Implement hitches have been devised which cause the implement to be elevated whenever increased resistance is met with by the implement. Such hitches are not entirely satisfactory in that they cause vacillation of the implement up and down resulting in work of a wavering depth. Also such hitches often cause the implement to ride entirely over areas offering increased resistance, as, for example, a large growth of Bermuda grass, instead of cutting through such areas to break up the soil and to remove the growths.

With conventional implement hitches, when a tractor crosses a furrow or rut in the ground the front end of the tractor will drop and thereby cause the implement to be lifted out of the ground. Likewise, when the front end of the tractor becomes elevated as by traveling over a small rise of the ground, the implement will be caused to dig deeply into the ground and in some instances deeply enough to anchor the tractor.

It is an important object of the present invention to provide a hitch structure for attaching a harrow to a tractor, which structure is selectively adjustable to cause the tractor to exert an upward pull on the harrow in instances as when soft soil is being worked so as to oppose the tendency of the implement to dig deeply into the soil.

Another object of the invention is to provide a hitch structure of the above mentioned character which is selectively adjustable to a position causing the tractor to exert a downward pull on the harrow when it is desired to increase the effective depth of the harrow as in cases when hard soil is being worked.

Another object of the invention is to provide a hitch for a harrow which causes the harrow to ride evenly in the ground and substantially reduces the amount of up and down motion that is characteristic of many present day implements.

A further object of the invention is to provide a harrow hitch which causes the harrow to cut through areas offering increased resistance rather than riding over such areas.

A further object of the invention is to provide a hitch of the above mentioned character which is adapted to be connected to a conventional tractor by way of a "three-point hook-up," thereby permitting its use with tractors generally without having to provide special connecting parts on the tractor as is required, for example, when a usual "four-point hook-up" arrangement is employed.

A general object of the invention is to produce a hitch of the above mentioned character which is reliable in operation and is of simple construction whereby it may be manufactured at a relatively low cost.

Further objects and advantages of the present invention will become apparent during the course of the following part of this specification wherein the details of construction and mode of operation of two embodiments of the invention are described with reference to the attached drawings, in which:

Fig. 3 is an enlarged side elevation of the hitch and harrow.

Fig. 4 is a fragmentary section taken substantially on line 4—4 of Fig. 3.

Fig. 5 is a fragmentary rear view of the hitch taken in the direction of the arrows of line 5—5 of Fig. 3.

Fig. 6 is a vertical longitudinal section through an adjustable connecting rod of the hitch.

Fig. 7 is a vertical longitudial section through another adjustable connecting rod of the hitch.

Fig. 8 is a side elevation of a modified form of the hitch of this invention.

Figure 1:
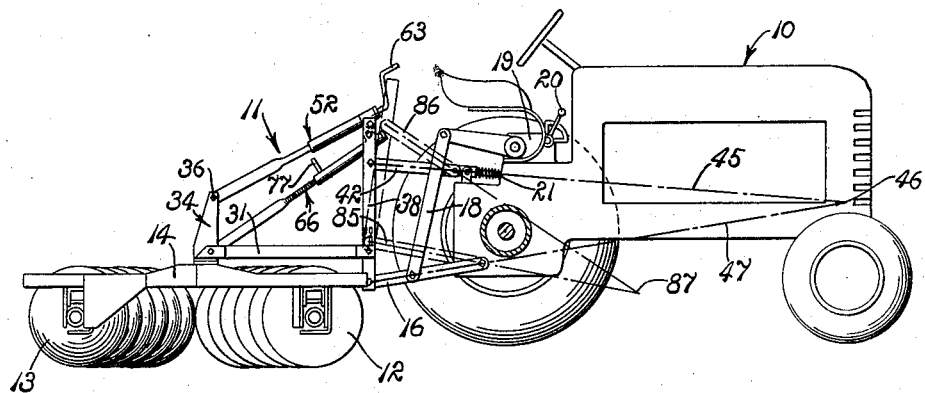
Fig. 1 is a side elevation of the hitch as in use between a tractor and disc harrow.
Figure 2:
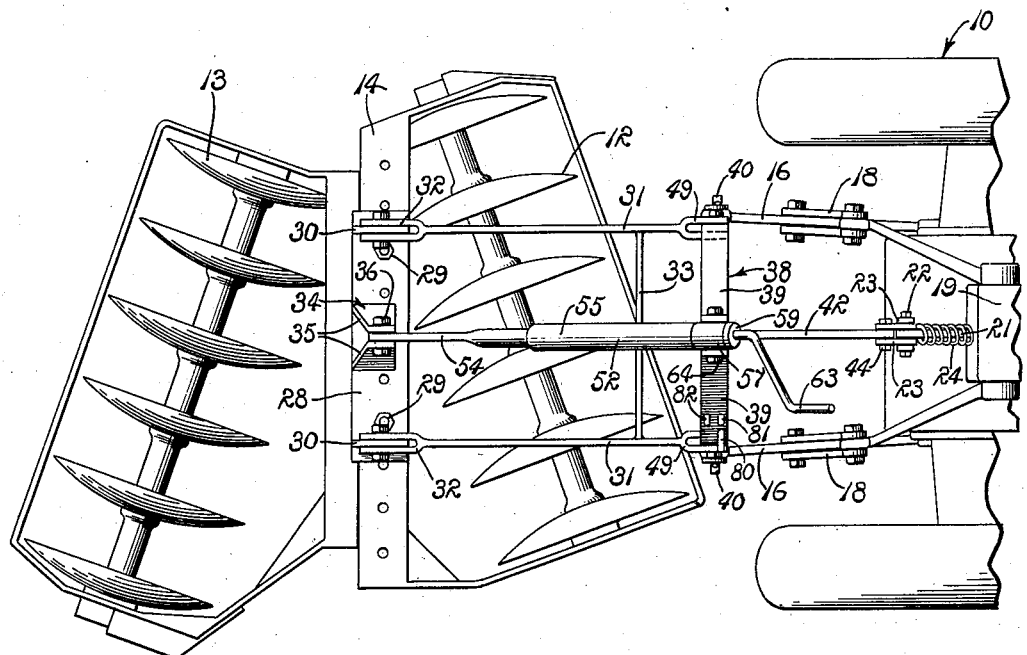
Fig. 2 is a plan view of the hitch as mounted on the harrow.

Referring in greater detail to the drawings:

Reference numeral 10 designates a tractor having a disc harrow attached to the rear of the tractor through a hitch structure embodying the invention and designated generally by numeral 11. The harrow includes a front gang 12 and a rear gang 13 interconnected by a frame 14.

The tractor 10 is of conventional type having a transversely spaced pair of pulling arms 16 adapted to be raised and lowered as on pivots 17 by means of lift arms 18 actuated by a hydraulic power unit 19. A hand-operated lever 20 controls the power unit 19 for raising or lowering the pulling arms 16 to a desired position. The tractor 10 has a plunger rod 21 pivoted as at 22 on a link 23 to move axially in an opening provided therefor in the body of the tractor. A spring 24 is associated with the plunger rod to resist forward movement of the plunger and a stop 25 limits outward movement of the plunger rod. As is well understood by those skilled in the art the plunger 21 constitutes a conventional control element for automatic actuation of the hydraulic power unit to raise the pulling arms when the spring 24 is contracted and to lower the pulling arms when the spring is expanded.

The hitch structure 11 includes a horizontal plate member 28 having holes therein for receiving bolts 29 to secure the plate on the frame 14 of the harrow. Standing upright on the ends of the plate and integral with the plate is a pair of attachment ears 30. A pair of transversely spaced longitudinally extending draft arms 31, having clevises 32 on their outer ends, are pivotally connected to the attachment ears for relative swinging movement forwardly of the plate each in a vertical longitudinal plane. There is a cross bar 33 extending transversely between the draft arms 31 and suitably secured to the arms as by welding or the like so as to add rigidity to the hitch structure and insure unitary action of the draft arms. Intermediate the ends of the plate and standing upright on the plate is a post unit or bracket 34 which in the embodiment shown constitutes two arms 35 spaced apart at their lower ends where they are welded or otherwise suitably secured to the plate and bent toward each other at their top portions so as to receive a pin 36. The disc harrow has a center of gravity intermediate the gangs 12 and 13. For reasons which will soon be apparent, the plate 28 is connected to the frame 14 adjacent to the center of gravity so that the arms 31 can be connected to the disc harrow and the bracket 34 provided adjacent to said center of gravity.

Spaced forwardly of the plate 28 by a distance equivalent to the length of the draft arms 31 is a rigid upstanding A-frame 38 having side arms 39 which are spaced apart at their lower ends to provide for pivotal connection, as indicated by the pivots 40, to the outer ends of the pulling arms 16. The side arms 39 are bent toward each other to provide a top portion 41 of the A-frame. As best shown in Fig. 4 of the drawing, the side arms 39 are spaced apart at the top portion 41 thereof, so as to receive between them the outer end of a compression link 42 which is pivotally connected as with pivot 43 to the top portion 41 of the A-frame. A pin 44 pivotally connects the forward end of the tension link 42 to the link 23 which supports the outer end of the plunger rod assembly 21. Compression link 42 is of a length such that it will cause the A-frame 38 to lie substantially in a transverse vertical plane when the A-frame is connected by the pivots 40 to the outer ends of the pulling arms 16. The vertical distance between the outer ends of the compression link 42 and the pulling arms 16 is preferably greater than the vertical distance between the inner ends of these members whereby the compression link 42 lies in a line (dot-dash line 45 of Fig. 1) which intersects a transverse plane through the pulling arms at a point 46 forwardly of the hitch structure; the transverse plane of the pulling arms being indicated by dot-dash line 47 in Fig. 1.

The forward ends of the draft arms 31 have clevises 49 for pivotally mounting the draft arms to the side arms 39 of the A-frame as with the pins 50. The pivot pins 50 are preferably spaced slightly upwardly on the arms 39 above the pivots 40 which attach the pulling arms of the tractor to the A-frame.

A longitudinally adjustable connecting rod unit 52 extends between the top of the A-frame 38 and the post unit 34. It is pivotally connected as with a pin 36 to the post unit so as to permit relative swinging movement of the connecting rod in a central vertical longitudinal plane through the hitch structure. The connecting rod unit 52 includes telescopic sleeves 54 and 55 (see Fig. 6). Extension or contraction of the unit 52 is accomplished selectively through the medium of a screw rod 56 journaled in a bushing 57 which is welded as at 58 or otherwise suitably formed integral with the forward end of the outer sleeve 55. The screw rod 56 has collars 59 and 60 to prevent axial movement of the rod in the bushing 57. The inner end of the screw rod is threaded as shown at 61 to engage internal threads 62 of the sleeve 54. The outer end of the screw rod is formed as a hand crank 63 for rotating the rod and thereby causing extension or contraction of the rod unit. The bushing 57 is pivotally mounted to the top of the A-frame 38 with a pivot pin 64.

Reference numeral 66 designates another adjustable connecting rod unit having a screw rod 67 which carries on its outer end a clevis 68 (Fig. 5) for pivotally connecting the outer end of the adjustable unit 66 to the base portion of the post unit 34, the pivot pin for such connection being designated by the numeral 69. The forward end of the screw rod 67 is externally threaded to engage internal threads 70 of a sleeve 71 (Fig. 7). Extending forwardly from the sleeve 71 is a stem 72 which is fastened to the forward end of the sleeve so as to rotate with the sleeve. The stem 72 is journaled in a bushing 73 and has a flanged head 74 which with the end face of the sleeve 71 prevents axial movement of the stem in the bushing. The bushing 73 has an attachment ear 75 for receiving a pin 76 which pivotally connects the forward end of the connecting rod unit 66 to the top portion 41 of the A-frame. A handle 77 projects outwardly from the sleeve 71 providing a convenient means for rotating the sleeve to contract or expand the rod unit 66.

Inasmuch as the A-frame is constrained to substantially vertical position, it will be evident that telescopic extension of the rod 66 of necessity skews the triangle formed by the rod, the arms 31 and the A-frame so as to raise the A-frame relative to the disc harrow. Conversely, telescopic contraction of the rod 66 skews the triangle to lower the A-frame relative to the disc harrow. Thus, as the A-frame is moved upwardly it will be evident that angle 79 (Fig. 3) between the A-frame and the draft arms 31 will be increased, and as the A-frame is moved downwardly the angle 79 will be decreased. Relative movement of the draft arms and the A-frame is conveniently indicated by means of a pointer such as that shown at 80 which is integral with one of the clevises 49 and is swingable in an arc between two points indicated on an adjacent side arm 39 of the A-frame by numerals 81 and 82.

The forward A-frame 28, the bracket 34, the draft arms 31, connecting rod 52, and the connecting rod 66 also constitute an elevationally skewable frame pivotally connected to the harrow 12, 13, and 14 and to the lift arms 16 wherein the connecting rod 66 acts as a means for adjustably skewing the frame to raise and to lower the pivotal connection represented by pivots 40, and the connecting rod 52 acts as a means manually operable to adjust the attitude of the harrow.

*Operation of first form*

In operation, let it be assumed that it is intended to use the harrow for working in soft soil. As explained above, when working in soft soil, a harrow, like other farm implements, has a tendency to dig too deeply. To oppose this tendency, the hitch structure 11 is set with respect to the tractor and to the frame 14 of the harrow in a lowermost position, such as that indicated by the full line position of the pulling arms 16 and the compression link 42 in Fig. 1. This position is attained by operation of hand lever 20 on the tractor. Such lowering of the A-frame 38 necessitates contraction of the adjustable connecting rod units 52 and 66. This adjustment of the connecting rod units is accomplished by turning the hand crank 63 and handle 77, causing the pointer 80 to be deflected forwardly and point in the direction of position 81 which for convenience may be marked "Soft" to designate the relative position of the parts of the hitch structure for operation in soft soil. With the A-frame thus being moved downwardly, the point 40 at which the pulling arms 16 are pivotally connected to the A-frame will be lowered and the convergence point 46 of the line 45 which intersects the transverse plane 47 of the pulling arms will be elevated. Thus, the components of force exerted by the tractor 10 on the harrow will include an upwardly directed component or pull on the hitch structure thereby opposing the tendency of the harrow discs to dig deeply into the ground.

Should it then be desirable to operate the disc harrow in hard soil, the A-frame is elevated vertically by expanding the connecting rod units 52 and 66 and by elevating the pulling arms 16 by operation of the hand-operated lever 20 on the tractor. Thus, the pulling arms 16 and the compression link 42 lie in positions indicated by the dot-dash lines 85 and 86 respectively in Fig. 1, and point 87 at which extensions of these members converge is below the previously mentioned convergence point 46. Also, raising of the A-frame causes the pointer 80 to swing in a direction toward the position 82 which, for convenience, may be marked "Hard." When the pulling arms 16 and the compression link 42 are in the dot-dash line positions shown in Fig. 1, the tractor 10 exerts a downwardly directed pull on the hitch structure thereby causing the discs on the harrow to dig more deeply into hard soil. It is, of course, understood from the foregoing that the pulling arms are elevationally adjustable so that the draft connections at 40 can move up and down within limits. This enables translation of draft force exerted by the tractor into vertical components imposed on the implement, as described.

When the hitch 11 is viewed in side elevation, it is seen that the connecting rod unit 66 constitutes the hypotenuse of a triangle defined by unit 66, draft arms 31 and A-frame 38. Thus in essence, the hitch 11 is of triangular form and holds the harrow in an elevated or lowered position as determined by the shape of such triangle. The connecting rod unit 52 functions to position the front and rear disc gangs of the harrow in a common horizontal plane, i. e. following adjustment of the rod unit 66 to define the elevation of pulling point 40, the rod unit 52 is expanded or contracted as necessary to move the lever, constituted by post unit 34, for positioning the frame 14 of the harrow in a horizontal plane. It may similarly be employed to tilt the disc harrow to raise or to lower one of the gangs relative to the other.

In crossing a rise in the ground the tractor is tilted upwardly causing buckling of the tractor with respect to the harrow and hitch structure, and if not otherwise provided for, would cause the harrow discs to dig deeply into the ground. When this buckling occurs the spring 24 is compressed and, as explained above, the plunger rod 21 causes actuation of the hydraulic power unit 19 thereby actuating the lift arms 18 to raise the pulling arms 16. Thus, when the pulling arms 16 are elevated, they raise the harrow and prevent it from digging deeply into the ground. Should the tractor meet with a furrow or rut in the ground, causing the front wheels of the tractor to be lowered in crossing the furrow, the normal tendency of the tractor and harrow hitch is to pull the harrow out of the ground. This tendency of the harrow to be lifted out of the ground is countered by actuation of the hydraulic power unit 19 which when the spring 24 is expanded, lowers the pulling arms 16 and thereby allows the harrow discs to remain in the soil. Thus, as the tractor travels over a rough field, the hydraulic power unit of the tractor actuates the pulling arms 16 so as to maintain the harrow discs at an even depth in the ground.

It is contemplated that the hitch structure provided by the present invention may be used with a tractor which is not provided with the plunger rod 21 and hydraulic power unit 19 for automatic lift control of the pulling arms 16. When the invention is used under such conditions, the advantages mentioned above in regard to raising or lowering of the forward end of the tractor in passing over rises and furrows in the ground will not be had; nevertheless, the remaining advantages of the present invention will be had and these are important enough to encourage extensive use of the invention.

*Second form*

Referring now to Fig. 8 of the drawing, a modified form of the hitch structure provided by this invention is shown and designated generally by reference numeral 90. In this form the parts of the hitch which permit selective elevation or lowering of the points at which the pulling arms of the tractor are connected to the hitch, are in essence arranged in the form of a parallelogram, as viewed in side elevation, instead of being in the form of a triangle as is present in the first described form. Such parallelogram includes a forward A-frame 91 which is similar in construction to that of A-frame 38 previously described, a second A-frame 92, a pair of transversely spaced longitudinally extending draft arms 93 each of which is pivotally connected at its ends to the lower portions of the side arms of the A-frames 91 and 92. There is a longitudinally adjustable rod unit 96 pivotally connected at its end to the upper portions of the A-frames 91 and 92 for selectively raising or lowering A-frame 91 in a vertical transverse plane to raise or lower pulling points 40' at which the pulling arms 16' of a tractor are pivotally connected to the hitch.

Extending rearwardly of the A-frame 92 and rigidly secured to the lower ends of the side arms thereof is a pair of support links 99, the outermost ends of which are pivotally connected one to each end of a horizontal plate member 28' to which a harrow frame 14' is secured. A post unit 34' extends upwardly from the plate member 28' so as to constitute a lever arm for positioning the frame 14' in a horizontal plane by operation of a longitudinally adjustable connecting rod unit 52' pivotally connected between the tops of lever 34' and A-frame 92.

Integral with the forward end of one of the support links 99 and lying over an adjacent draft arm 93 is a pointer 101 the forward end of which registers with an indication 102 when the A-frame 91 is lowered for purposes of operation of the harrow in soft soil, and which registers with an indication 103 when the A-frame is elevated for purposes of operation of the harrow in hard soil.

Although the invention has been herein shown and described in what is conceived to be the most practical and preferred embodiments thereof, it is recognized that departures may be made therefrom within the scope of the invention, which is not to be limited to the details disclosed herein but is to be accorded the full scope of the claims so as to embrace any and all equivalent devices.

Having thus described my invention, what I claim as new and desire to secure by Letters Patent is:

1. A hitch, for connecting an agricultural implement having forward and rearward end portions and a center of gravity intermediate said forward and rearward end portions to a prime mover, comprising a frame mounted on the prime mover, arm means pivotally mounted on the frame and substantially horizontally extended therefrom over the implement, means pivotally connecting the implement at a position adjacent to its center of gravity to the arm means, a telescopically adjustable link connected to the arm means and to the frame at a position in elevationally spaced relation to said arm means whereby contraction and extension of the link elevationally pivots the arms and raises and lowers the implement connected thereto, a bracket rigidly mounted on the implement adjacent to the center of gravity thereof, and a second telescopically adjustable link connected to the bracket and to the frame at a position in elevationally spaced relation to the arm means whereby contraction and extension of the second link adjustably tips the implement on the arm means.

2. A draft hitch for attachment of an implement to a tractor which includes, at the rear, a transversely spaced pair of vertically adjustable pulling arms, the hitch comprising a transverse frame arranged for substantially vertical positioning behind the tractor and adapted to be pivotally connected to the pulling arms whereby the frame is movable to an elevated position in which the pull exerted on the frame by the pulling arms includes a downwardly directed component of force and the frame is movable to a lowered position in which the pull exerted on the frame through the pulling arms includes an upwardly directed component of force; a compression link pivotally connected at one end thereof to the frame above the points of connection for the pulling arms and pivotally connected at its other end to the tractor; upright lever means secured on the top of the implement; a pair of transversely spaced and longitudinally extending draft arms pivotally connected to the frame and to the lever means; longitudinally adjustable means pivotally connected to the frame at a point above the points at which the draft arms are connected to the frame and pivotally connected to the lever means so as to form a triangle with a portion of the frame and with the draft arms, and a longitudinally adjustable rod pivotally connected to the frame and to the lever means for selectively moving the top of the lever means toward and away from the frame.

3. In a device for attaching an implement to a tractor wherein the implement includes a frame and the tractor includes at the rear thereof a transversely spaced pair of pulling arms, the combination with said implement and tractor of a hitch structure comprising a horizontal member secured to the implement frame; an upstanding member integral with the horizontal member; a rigid vertically arranged A-frame spaced forwardly of the horizontal member; means pivotally connecting the pulling arms to the lower portions of the A-frame; a pair of transversely spaced longitudinally extending draft arms pivotally connected at their rearward ends to the horizontal member and at their forward ends to the A-frame; a compression link pivotally connected to the upper portion of the A-frame and pivotally connected to the tractor at a position above the pulling arms; rod means longitudinally adjustable and pivotally connected at one end thereof to the upstanding member and at the other end thereof to the upper portion of the A-frame; and additional rod means longitudinally adjustable and in pivotal association at one end thereof with the horizontal member and at the other end thereof with the upper portion of the A-frame.

4. A draft hitch for connecting an agricultural implement having a frame to a draft appliance comprising a substantially triangular member having an upright element mounted on the draft appliance, an arm pivotally connected to the upright element and to the frame, and a telescopically adjustable hypotenuse element pivotally connected to the upright element above the arm and pivotally connected to the arm in spaced relation to the upright element; and means interconnecting the upright element of the triangular member and the frame of the implement adjustably pivotally positioning the frame on the arm.

5. A draft hitch for connecting an agricultural implement to a draft appliance whereby draft forces of the appliance are adjustably translated into components of force exerted elevationally on the implement comprising a substantially upright frame, a pair of pulling arms pivotally mounted on the draft appliance and pivotally mounting the frame on the draft appliance for floating elevational movement thereon, a pair of draft arms pivotally connected to the frame and having extended ends pivotally connected to the implement, a telescopically adjustable link pivotally interconnecting the extended ends of the draft arms and the frame at a position in elevationally spaced relation to the draft arms, a bracket rigidly mounted on the implement adjacent to the pivotal connection of the draft arms thereto, and a second telescopically adjustable link pivotally interconnecting the bracket and the frame at a position in elevationally spaced relation to the draft arms.

6. A draft hitch, for use in coupling an agricultural implement to a tractor having a pair of rearwardly extended lift arms, a frame mounted in a substantially erect position on the extended ends of the lift arms for forward and rearward tipping thereon, powered means for raising and lowering the lift arms, a control system connected to the powered means, and a link interconnecting the frame and the control system for automatically operating the powered means to raise the lift arms when the frame is tipped forwardly and to lower the lift arms when the frame is tipped rearwardly; a draft hitch for coupling an implement to the frame adapted adjustably to translate draft force of the tractor into regulated components of force exerted elevationally on the implement, comprising a pair of draft arms having forward ends pivotally mounted on the frame for pivotal elevational movement and rearward ends pivotally connected to the implement, and a telescopically adjustable link pivotally connected to the implement at a position in substantial axial alignment with the pivotal connection of the draft arms thereto and pivotally connected to the frame at a position in elevationally spaced relation to the draft arms.

7. In combination with a tractor having a pair of rearwardly extended lift arms, a frame mounted in a substantially erect position on the extended ends of the lift arms for forward and rearward tipping thereon, powered means for raising and lowering the lift arms, a control system connected to the powered means, and a link interconnecting the frame and the control system for automatically operating the powered means to raise the lift arms when the frame is tipped forwardly and to lower the lift arms when the frame is tipped rearwardly; a draft hitch for coupling an implement to the frame adapted adjustably to translate draft force of the tractor into regulated components of force exerted elevationally on the implement, comprising a pair of draft arms having forward ends pivotally mounted on the frame for pivotal elevational movement and rearward ends pivotally connected to the implement, a telescopically adjustable link pivotally connected to the implement at a position in substantial alignment with the pivotal connection of the draft arms thereto and pivotally connected to the frame at a position in elevationally spaced relation to the draft arms, a bracket upwardly extended from the implement adjacent to the pivotal connection of the arms and the link thereto, and a substantially rigid member pivotally interconnecting the bracket and the frame at a position in elevationally spaced relation to the draft arms.

8. In combination with a tractor having a pair of rearwardly extended lift arms mounted for pivotal movement on the tractor, a frame mounted in a substantially erect position on the extended ends of the lift arms for forward and rearward tipping thereon, powered means for raising and lowering the lift arms, a control system connected to the powered means, and a link interconnecting the frame and the control system for automatically operating the powered means to raise the lift arms when the frame is tipped forwardly and to lower the lift arms when the frame is tipped rearwardly; a draft hitch for coupling a disc harrow having a pair of framed gangs of discs and a center of balance intermediate the gangs adapted adjustably to translate draft force of the tractor into regulated components of force exerted elevationally on the disc harrow, comprising a pair of draft arms having forward ends pivotally mounted on the frame for pivotal elevational movement and rearward ends pivotally connected to the disc harrow adjacent to the center of balance thereof, a telescopically adjustable link pivotally connected to the disc harrow adjacent to the center of gravity thereof and pivotally connected to the frame at a position in elevationally spaced relation to the draft arms, a bracket upwardly extended from the disc harrow at a position adjacent to the center of gravity thereof, and a telescopically adjustable rod pivotally interconnecting the bracket and the frame at a position in elevationally spaced relation to the draft arms.

References Cited in the file of this patent

UNITED STATES PATENTS

| 2,118,180 | Ferguson | May 24, 1938 |
| 2,440,550 | Martin | Apr. 27, 1948 |
| 2,456,693 | Fraga | Dec. 21, 1948 |
| 2,526,396 | Nowlin | Oct. 17, 1950 |
| 2,552,307 | Bowman | May 8, 1951 |
| 2,575,622 | Fraga | Nov. 20, 1951 |
| 2,635,519 | Cook | Apr. 21, 1953 |

FOREIGN PATENTS

| 665,140 | Great Britain | Jan. 16, 1950 |